United States Patent [19]

King et al.

[11] Patent Number: 5,479,849
[45] Date of Patent: Jan. 2, 1996

[54] LOWER CHAMBER VENT FOR THE LOWER CHAMBER OF A BREWING MACHINE

[75] Inventors: Brian King, Belmont, Mass.; Paul King, Montreal; Stan McLean, Dorval, both of Canada

[73] Assignee: VKI Technologies, Inc., Quebec, Canada

[21] Appl. No.: 414,802

[22] Filed: Mar. 31, 1995

[51] Int. Cl.$^6$ ................................................ A47J 31/32
[52] U.S. Cl. .......................... 99/287; 99/289 T; 99/289 R
[58] Field of Search ................................. 99/287, 289 R, 99/289 T, 279, 289 D, 289 P, 297, 300, 302 R, 302 P; 426/433

[56] References Cited

U.S. PATENT DOCUMENTS

| | | | |
|---|---|---|---|
| 3,565,641 | 2/1971 | King | 99/302 P |
| 3,660,117 | 5/1972 | Neely | 99/289 R |
| 4,632,023 | 12/1986 | King | 99/289 T |
| 4,903,586 | 2/1990 | King | 99/289 R |
| 5,337,653 | 8/1994 | Sellers | 99/289 R |
| 5,349,897 | 9/1994 | King | 99/289 R |
| 5,351,604 | 10/1994 | King | 99/289 R |

*Primary Examiner*—Robert W. Jenkins
*Attorney, Agent, or Firm*—Hill, Steadman & Simpson

[57] ABSTRACT

A coffee brewing machine which allows the coffee to be more rapidly removed from the lower brewing chamber by providing a vent opening which opens to relieve the vacuum and allows the coffee to be discharged. In one embodiment, the vent opening is opened and closed by a plug on the upper brewing chamber. On another embodiment the vent hole is opened and closed by an actuator. In a third embodiment, a portion of the coffee filter serves as the vent hole.

6 Claims, 5 Drawing Sheets

LOWER CHAMBER VENT FOR THE LOWER CHAMBER OF A BREWING MACHINE

BACKGROUND OF THE INVENTION

1. Field of the Invention

This invention relates in general to method and apparatus for producing coffee, tea or other beverages during a single cycle. Particularly, this invention is an improvement in coffee brewing machines and it allows the lower chamber to drain more rapidly and allows the mechanism to brew more cups between cleaning the filter element.

2. Description of the Related Art

The present invention is an improvement in single cup beverage brewers such as described in U.S. Pat. No. 5,351,604 which issued on Oct. 4, 1994 and U.S. Pat. No. 5,349,897 which issued on Sep. 27, 1994 both of which were improvements on the apparatus described in U.S. Pat. No. 3,565,641 which issued Feb. 23, 1971, all of which are assigned to the assignee of the present application. These three patents describe methods and apparatus for producing a single cup of coffee. The apparatus consists of an upper chamber which is open at the top to allow coffee and hot water to enter and be mixed. For most of the cycle the upper chamber is tightly sealed to a lower chamber.

The top of the lower chamber has a filter element that allows liquids to move between the two chambers. The lower chamber contains a piston which can move air up and down. The piston first moves upwardly to force air through the mixture of coffee and water in the upper chamber. This movement of air agitates the coffee and water. The piston then travels downwardly and draws the liquid coffee through the filter element. The liquid coffee is drawn down until it reaches an opening in the lower chamber where it pours out along a spout. The chambers are then separated to so that the spent coffee grounds can be removed.

The apparatus described in U.S. Pat. No. 5,351,604 has a fixed permanent filter element on the top of the lower chamber. The coffee grounds are removed by a wiper which traverses the filter element and scrapes the residue until it falls into a waste container. As each cup of coffee is brewed more and more residue accumulates on the filter element. Airflow through the filter element becomes restricted because of this residue. When the liquid coffee tries to exit the lower chamber, it is restricted as there continues to be a vacuum in the lower chamber. Air eventually seeps into the lower chamber and allows the lower chamber to empty but this can take several seconds. This delay time can be reduced by cleaning the filter element to remove the residue.

SUMMARY OF THE INVENTION

The present invention allows the brewing mechanism to brew more cups of coffee without cleaning of the filter element.

It is an object of the invention to allow additional ventilation for the lower chamber when it is emptying so as to allow the liquid coffee to quickly and smoothly exit the lower chamber. This is especially true when the brewing mechanism has made many cups and the filter element has excessive residue on it. The invention allows more cups of coffee to be brewed without cleaning the filter element.

It is a feature of the present invention to provide an air vent opening in the lower brewing chamber which is opened during the time that the coffee is being removed from the lower chamber and which changes the pressure in the lower chamber so that the coffee can quickly and smoothly flow out of the lower chamber.

It is a feature of the present invention to provide a vent hole into the lower brewing chamber which is sealed shut when the upper and lower brewing chambers are sealed together and which is opened when the upper and lower brewing chamber separate so that the coffee may smoothly and rapidly flow out of the lower chamber.

It is another feature of the present invention to provide a vent opening in the lower chamber which during certain portions of the brewing cycle is closed and which opens as the coffee is being discharged from the lower brewing chamber so that it may quickly and smoothly flow from the lower brewing chamber.

Another feature of the invention is to provide that a portion of the upper chamber gasket blocks a portion of the filter element so as to seal such portion of the filter element from coffee grounds so that they are not allowed on that portion of the filter element. Thus, the shielded portion of the filter element will not accumulate as much residue and will provide good ventilation for the lower chamber when the upper and lower chambers are separated.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
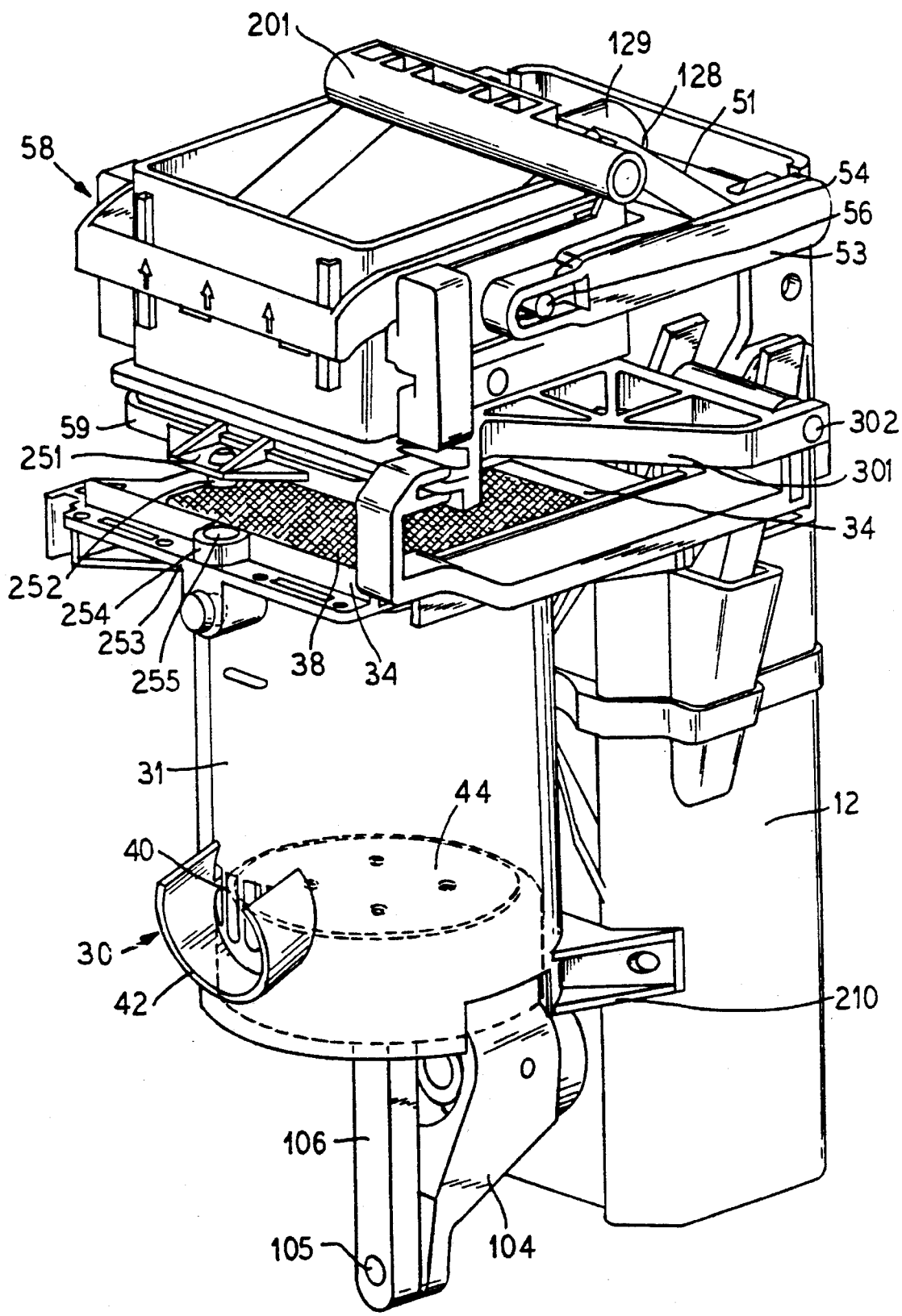
FIG. 1 is a perspective view of the preferred embodiment of the invention.

FIGS. 1–4 illustrate the preferred embodiment of the present invention of a beverage brewer which has a lower beverage brewing chamber 30 formed with cylindrical walls 31 and an upper brewing chamber 58. The lower brewing chamber 31 is connected by bracket member 210 to the lower frame member 12 and a piston 44 is movably mounted in the lower brewing chamber 31 and is connected by a piston rod 106 to a crank arm 104 by pivot pin 105. The crank arm 104 is mounted on shaft 102 rotatably mounted in the frame member 12 and which has a coupling member 103 that can be connected to the output of a suitable driving motor as shown in greater detail in U.S. Pat. No. 5,351,604. The top plate 34 of the lower brewing chamber 31 is formed with an opening over which a filter 38 is mounted. The lower brewing chamber 31 is formed with discharge openings 40 adjacent its lower end and a spout 42 is mounted over the discharge openings 40 so that brewed beverage such as coffee can pass from the lower brewing chamber 41 through the openings 40 into a cup.

The upper brewing chamber 58 is formed with outer walls 69 and a pair of baffles 202 and 203 which extend inwardly in a top portion of the upper chamber 69. The upper chamber 69 is movably supported on support arms 51 and 53 which engage mating pins such as 56 mounted on the upper brewing chamber 69 as shown in FIG. 1. The arms 52 and 53 are connected by a cross-member 51 which is engaged by a cross-member 131 which is connected by a horizontal portion 129 to a rod 128 which is connected to a cam follower 122 that engages a cam 112 mounted on shaft 102. A roller 124 is mounted in the cam follower 122 and engages the cam 112.

Figure 2:
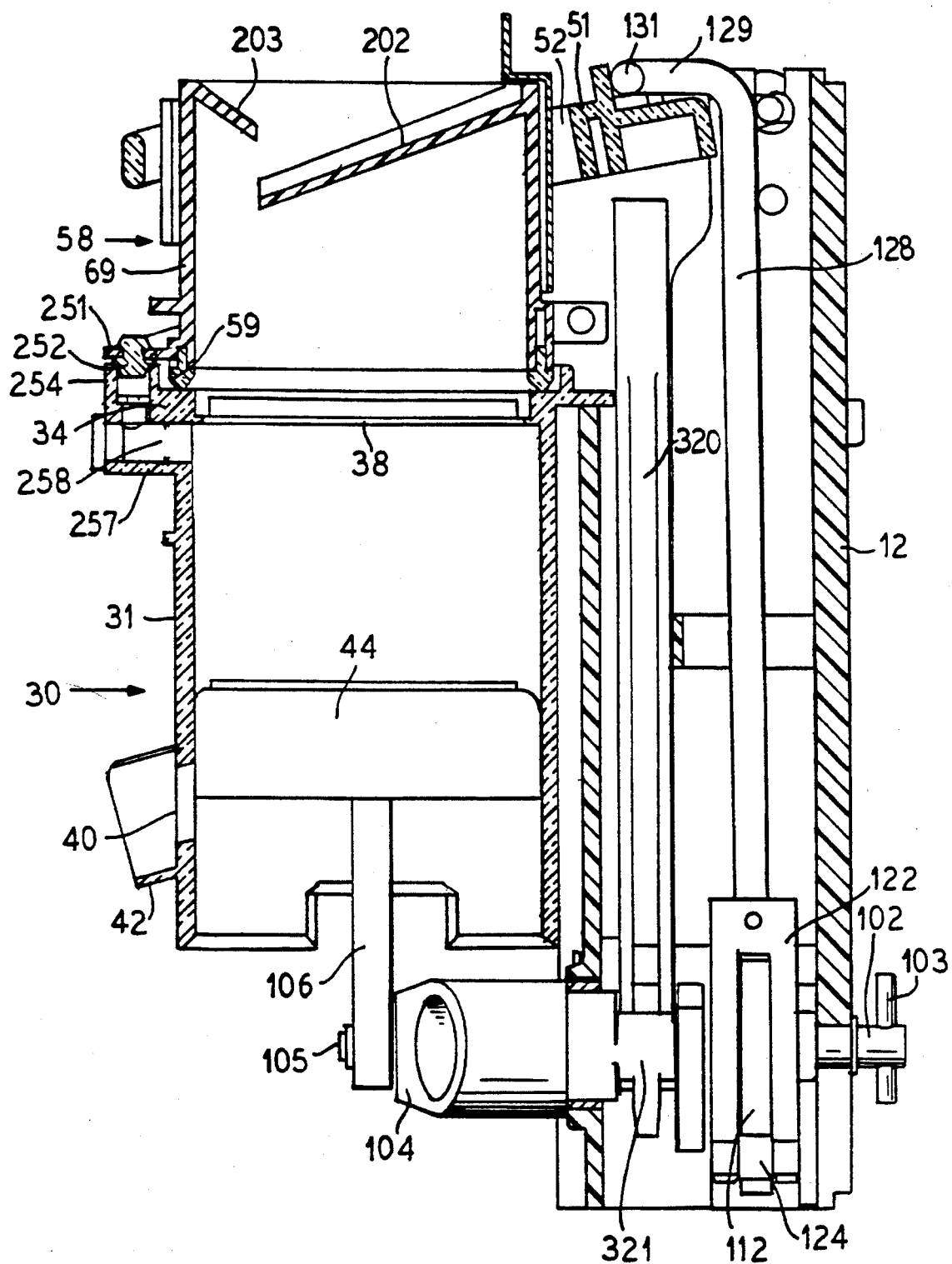
FIG. 2 is a sectional view illustrating the preferred embodiment of the invention.
Figure 3:
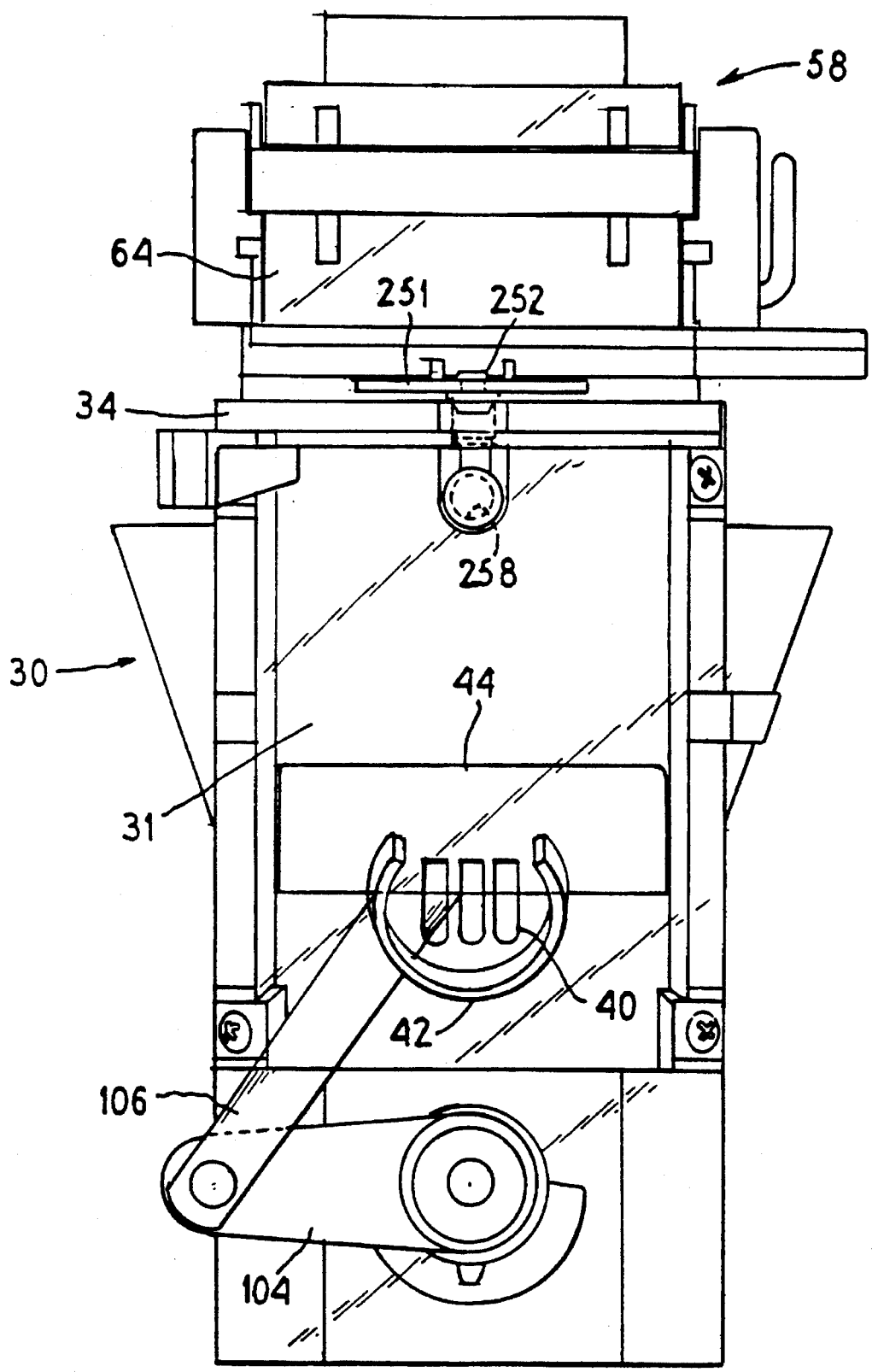
FIG. 3 is a front plan view illustrating the preferred embodiment of the invention.
Figure 4:
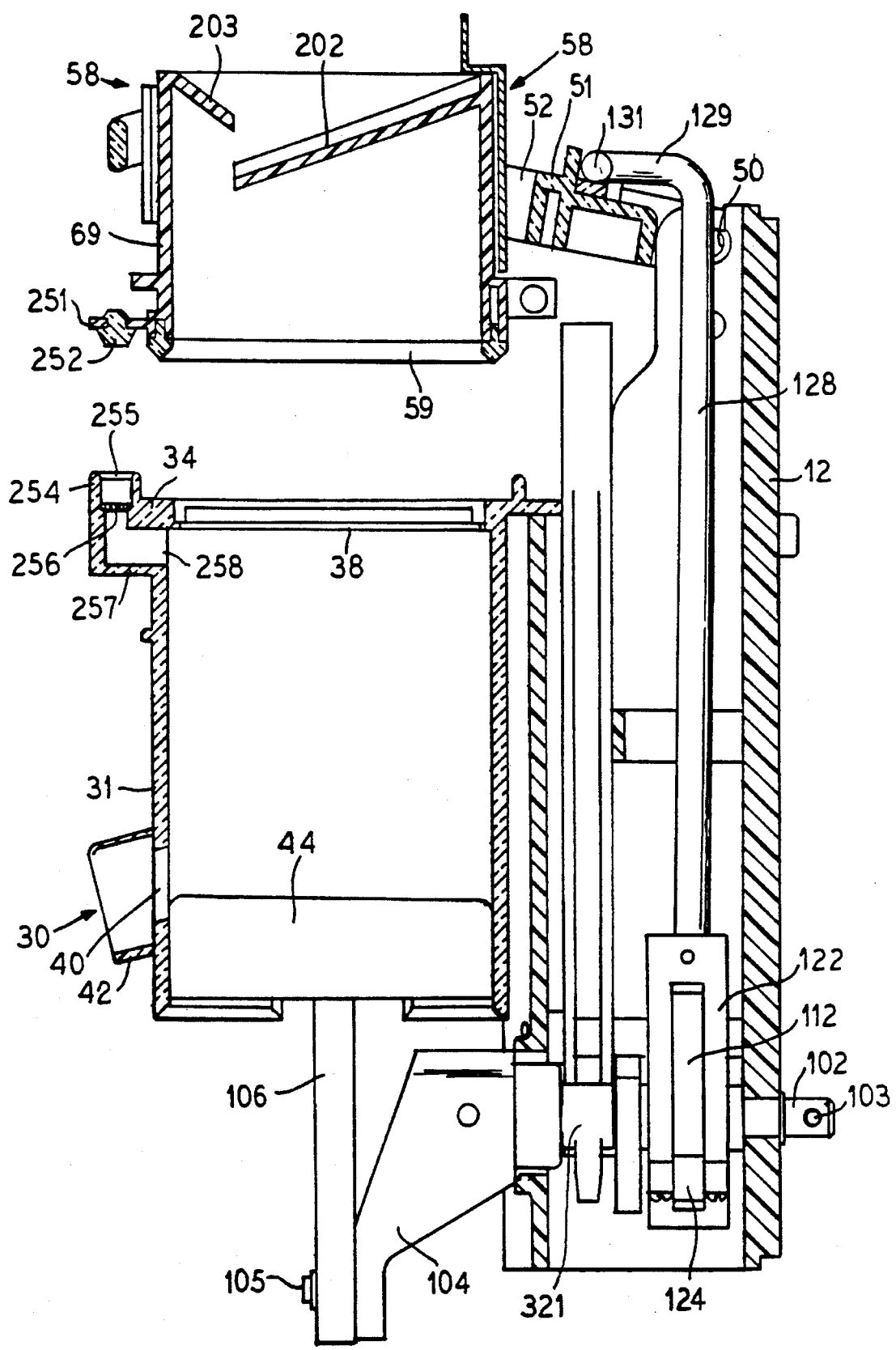
FIG. 4 is a sectional view of the invention illustrating the upper and lower brewing chambers separated.

A sealing gasket 59 is mounted on the lower end of the upper brewing chamber 69 and engages the top plate 34 of the lower brewing chamber 31 when the upper and lower brewing chambers are engaged so as to form a seal. A vent hole 258 is formed in the upper portion of the lower brewing chamber 31 as best shown in FIGS. 2 and 4 and a conduit 257 extends outwardly from the lower brewing chamber 31 and has an upwardly extending portion 254 which is formed with an opening 255. A filter 256 is mounted in the conduit 254. The lower portion of the upper brewing chamber 69 carries a bracket 251 which carries a seal 252 which may be made of flexible material and which is engageable in opening 255 of conduit 254 when the upper brewing chamber 69 is engaged with the lower brewing chamber 31 as is shown in FIGS. 2 and 3. The vent 252 may be made of a gasket material such as silicon rubber so that it seals the vent opening 255 when pressed against it. When the plug 252 is sealed in the opening 255, the vent hole 258 is sealed and so that no air or liquid can pass through the vent hole.

Prior to the beginning of the operative cycle, the upper brew chamber 69 is clamped down by the rod 128 and arms 52 and 53 so that the gasket 59 seals the upper brew chamber to the lower brew chamber by engaging the upper plate 34 of the lower brewing chamber 31. As is described in detail in U.S. Pat. No. 5,351,604, during the brewing cycle the upper and lower brewing chambers are alternately connected together and sealed and separated as the piston 44 moves upwardly and downwardly in the lower brewing chamber 31.

Prior to the beginning of an operative cycle, the upper brewing chamber 58 is clamped down and sealed against the lower brewing chamber 30 and is in the position shown in FIG. 2. At this time, the vent plug 252 seals the opening 255 so that the vent opening 258 is closed. The upper chamber 58 remains clamped down to the lower chamber 30 during the first 190° of the operating cycle. During this part of the cycle, the coffee and water are dispensed into the upper chamber 58 and agitated by air that is forced in the upper chamber 69 by the piston 44 as it travels upwardly. Then the coffee liquid is pulled through the filter element 38 into the lower brewing chamber 31 as the piston 44 moves downwardly.

As shown in FIG. 4, during the next 170° of the operating cycle, the upper chamber 58 is lifted away from the top of the lower chamber 30 by the rod 128 and as this occurs the vent hole 255 is uncovered since the vent plug 252 disengages. The piston 44 continues its downward travel and uncovers the openings 40 in the lower brewing chamber 31 which allows the coffee liquid to pour out the spout 42. The vent hole 258 allows air to enter the top portion of the lower chamber 31 which lets the coffee liquid quickly evacuate the lower chamber 31, since it releases the partial vacuum existing in the lower brewing chamber 31. The cycle is completed when the upper chamber 69 is closed again sealing the top of the lower chamber 31 and the vent plug 252 closes the vent hole 255 in the top plate 34. It is to be realized, of course, that as shown in U.S. Pat. No. 5,351,604, the used coffee grounds are removed from the filter 38 by wiper mechanism 320 which is driven by a cam 321. For further details on the wiper structure reference is hereby made to U.S. Pat. No. 5,351,604 which disclosure is hereby incorporated by reference.

Figure 5:
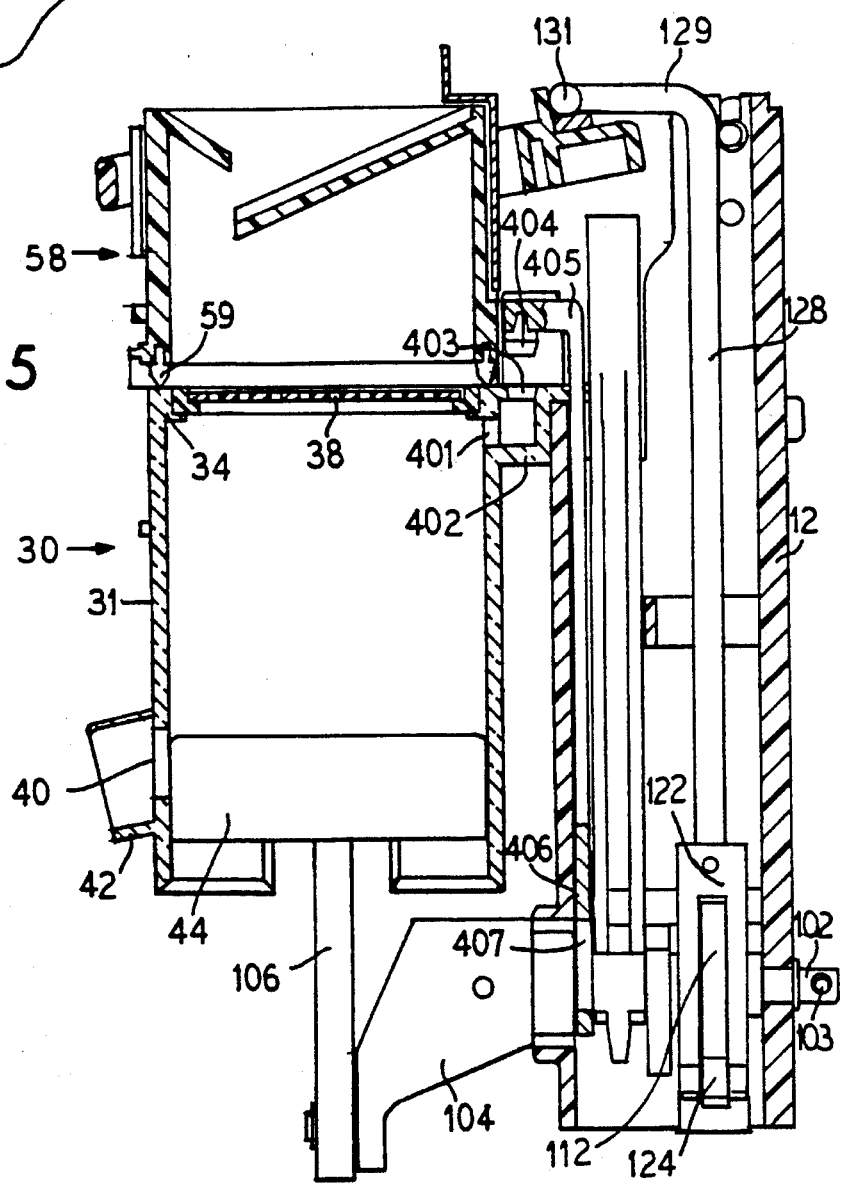
FIG. 5 is a sectional view illustrating a modification of the invention.

Thus, it is seen that the present invention allows the brewing cycle to be shortened by releasing the partial vacuum that exists in the lower chamber as the piston 44 moves downwardly by allowing air to pass through the vent opening 258 into the lower brewing chamber so that the coffee will quickly flow out of the openings and spout 42. FIG. 5 illustrates a modification of the invention in which a vent hole 401 is formed in an upper portion of the lower brewing chamber 31 and which is connected to a conduit 402 which has an external opening 403 that is engageable with a vent plug 404 carried on a arm 405 which is mounted in a suitable guide and has a cam engaging portion 406 which engages a cam 407 that is mounted on the drive shaft 102. The cam 407 moves the push rod 405 so as to open and close the vent plug 404 from the opening 403. The opening and closing of the vent plug 404 is timed so that the vent plug 404 opens as the piston 42 moves into alignment with the openings 40 so as to allow the brewed coffee in the lower brewing chamber 31 to pass out the openings 40 and the spout 42. Although the vent opening is shown in the uppermost portion of the lower brewing chamber, it is to be realized that it may be in any selected position and that such vent opening is closed during the brewing cycle until the coffee or other beverage is to be discharged from the openings 40 as the piston 44 moves downwardly. The opening and closing of the vent opening 401 is controlled by the cam 407 and the drive shaft 102.

Figure 6:
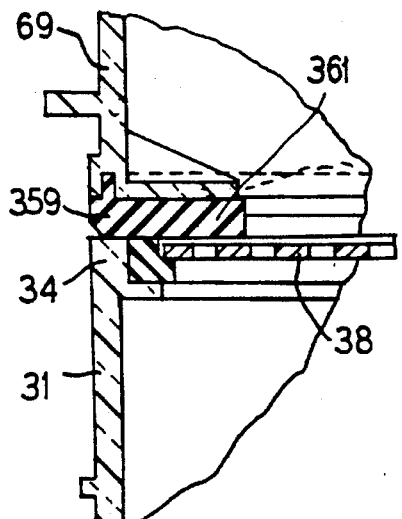
FIG. 6 is a detail sectional view illustrating a further modification of the invention.
Figure 7:
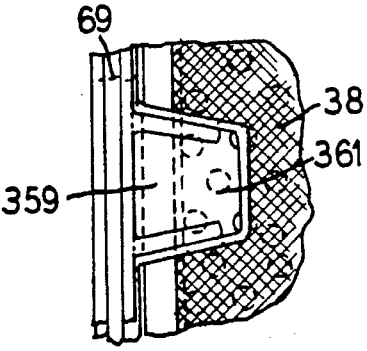
FIG. 7 is a cut-away top view illustrating the modification shown in FIG. 6.

FIGS. 6 and 7 illustrate a further modification of the embodiment wherein the gasket 359 which seals the upper brewing chamber to the lower brewing chamber plate 34 has an extending portion 361 which extends over a portion of the filter 38 so as to block it so that coffee grounds do not cover that portion of the filter 38 which is under the extending portion 61 of the gasket 359. Thus, when the upper chamber 69 is moved upwardly, that portion of the gasket 38 which was covered by the portion 361 will not be clogged with coffee grounds and air can then pass through this unclogged portion of the filter 38 so as to relieve the partial vacuum in the lower brewing chamber to allow the brewed coffee to pass out the openings 40 in a rapid manner.

Although the invention has been described with respect to preferred embodiments, it is not to be so limited as changes and modifications can be made therein which are within the full intended scope of the invention as defined by the appended claims.

We claim as our invention:

1. Apparatus for brewing a beverage comprising, in combination:

an upper chamber for receiving and containing hot water in a brewing material and having an open lower end, a lower chamber having an open upper end and a drain opening in a lower portion thereof, a filter mounted over the upper end of said lower chamber preventing passage of the brewing material, means for providing relative movement between said lower chamber and said upper chamber to move said chambers between a first position wherein said filter is clamped between said lower end of said upper chamber and said upper end of said lower chamber and said upper and lower chambers are sealed together and a second position wherein said lower end of said upper chamber is spaced from said upper end of said lower chamber, a piston moveably mounted in said lower chamber and timed to move with the relative movement between said upper and lower chambers, and vent means provided in said lower chamber for allowing air to pass into said lower chamber so as to speed the discharge time of beverage from the drain opening of the lower chamber.

2. The apparatus of claim 1 wherein said vent means comprises a vent passage which has one end which communicates with said lower chamber and has a second end which extends externally of said lower chamber, and a sealing plug for sealing engagement with said vent passage which periodically is removed from said vent passage to allow air to enter said lower chamber.

3. The apparatus of claim 2 wherein said sealing plug is connected to said upper chamber and seals said vent passage when said filter is clamped between said lower end of said upper chamber and the upper end of said lower chamber, and said sealing plug moves out of engagement with said vent passage when said lower end of said upper chamber is spaced from said upper end of said lower chamber.

4. The apparatus of claim 2 wherein said sealing plug is mounted on an actuator member, and a driving means connected to said actuator member to move it so as to engage and disengage said sealing plug from said vent passage.

5. The apparatus of claim 4 wherein said driving means includes a motor with an output shaft and a cam mounted on said output shaft, and a cam follower connected to said actuator member and engageable with said cam.

6. The apparatus of claim 1 wherein said vent means includes a gasket which is attached to the lower end of said upper chamber and which has an extending portion which extends over and engages a portion of said filter when the lower end of the upper chamber and the upper end of the lower chamber clamp said filter, and wherein said extending portion moves out of engagement with said portion of said filter when said lower end of said upper chamber is spaced from said upper end of said lower chamber.

* * * * *

UNITED STATES PATENT AND TRADEMARK OFFICE
CERTIFICATE OF CORRECTION

PATENT NO. : 5,479,849
DATED : January 2, 1996
INVENTOR(S) : Brian L. King et al It is certified that error appears in the above-indentified patent and that said Letters Patent is hereby corrected as shown below:

Column 3, line 15, after the period insert --Secondary pivot arms 301 are pivotally connected by pins 302 to the frame 12 and to the upper brewing chamber 69 so that the upper brewing chamber moves in the vertical direction relative to the lower chamber.--

Signed and Sealed this

Seventeenth Day of September, 1996

Attest:

BRUCE LEHMAN

*Attesting Officer*     *Commissioner of Patents and Trademarks*